United States Patent Office 3,515,701
Patented June 2, 1970

3,515,701
RUBBERY POLYPERFLUOROALKYLENE OXIDES
AND PROCESS THEREFOR
George Van Dyke Tiers, St. Paul, Minn., assignor to Minnesota Mining and Manufacturing Company, St. Paul, Minn., a corporation of Delaware
No Drawing. Continuation-in-part of application Ser. No. 262,252, Mar. 1, 1963. This application May 31, 1966, Ser. No. 553,696
Int. Cl. C08g 33/00; C07c 59/00
U.S. Cl. 260—78.4
10 Claims

ABSTRACT OF THE DISCLOSURE

By pyrolysis of mercury or silver salts of dibasic oxa-atom containing perfluorocarboxylic acids, as such or mixed with such salts of dibasic perfluorocarboxylic acids or perfluoromonocarboxylic acids, there are obtained rubbery, fluorocarbon solvent-swellable polyperfluoroalkylene oxides having from 100 to 10,000 oxygen-linked repeating units.

---

This invention relates to fluorinated polymers and more particularly to certain polyperfluoroalkylene oxides and a process for their production.

This application is a continuation-in-part of application Ser. No. 262,252, filed Mar. 1, 1963 now abandoned.

Oxygen-linked polyperfluoralkylene polymers have been available heretofore, as described in U.S. Pats. 3,-125,599; 3,250,806; 3,250,807 and 3,250,808. However, the materials described in the prior art have been solids of relatively low molecular weight, or liquids, which are soluble in suitable organic solvents. So far as applicant is aware, no insoluble elastomeric or rubbery polymers of high molecular weight comprised of oxygen-linked polyperfluoroalkylene structural units have been known heretofore; nor have crosslinked oxygen-linked polymers of this type been available.

In one aspect, this invention contemplates the preparation of rubbery polymers containing essentially only fluorine, oxygen and carbon.

In another aspect, the invention is embodied in certain polymers having novel oxygen-linked repeating units which may be of a wide range of molecular weights.

A further embodiment of the invention is a process for producing the polymers contemplated herein.

According to the invention there are provided rubbery polymers containing essentially only carbon, oxygen and fluorine, having consecutive, backbone-forming units in which the ratio of fluorine to carbon is 2:1 and which contain oxygen as a linking group, each oxygen atom being linked only to carbon. Further, the ratio of carbon to oxygen in these polymers is at least 2:1 and not over 8:1. By "essentially" is meant that not more than about one percent by weight of these polymers consists of other atoms. These other atoms which may be present include metal atoms, e.g. chromium, nickel, etc., nitrogen, sulfur and the like. It will be apparent that these atoms which can be present in small amounts include crosslinking atoms; it is understood they are bound in the polymer as chemical structural units rather than as fillers or extenders and are not removable without degradation of the polymer. Conversely, the limitation on the other atoms present is not to be construed as applying to fillers or extenders, which can be added in compounding to modify the properties of the rubber, as described hereinbelow.

These polymers contain structural units which have the formulae

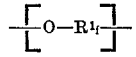

and

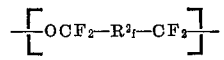

wherein $R^1_f$ is a straight chain or branched chain perfluoroalkylene radical having from 2 to 8 carbon atoms, and $R^2_f$ is a perfluoroalkylene radical having from zero to 21 carbon atoms. The polymer is composed of chains of structural units (consisting of a linking oxygen atom and attached carbon chain as shown) which have random location in the chain where the numbers of carbon atoms between oxygen-linking atoms are not identical. These chains are to a certain extent crosslinked, as will be described in more detail hereinbelow.

These rubbery polymers have definite glass transition temperatures, rather than melting points. They are insoluble in and not swelled by organic solvents, but swell when exposed to fluorocarbon-type solvents. They are useful as solvent-resistant rubbers which are stable at relatively high temperatures; thus they can be used for valve packings, gaskets and the like, which are to be employed in high-temperature environments.

A group of polymers coming within the broad terms of the description above, but which have novel repeating units and which may be of a wider range of molecular weights, is also included in the scope of the invention.

This group includes polymers composed essentially of repeating units of the formula

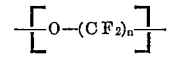

wherein $n$ is an integer from 4 to 20. Successive or sequential units in the backbone can be random with respect to $n$, and considering the polymers as a whole, $n$ as an average is a number from 4 to 20. The polymer chains, particularly where of lower molecular weight, are generally terminated by carbonyl-linked end groups, or by perfluoroalkyl end groups.

Rubbery polymers of the above formula in which $n$ is 4 are particularly preferred because of their superior low temperature flexibility.

These polymers are substances ranging from oily, or waxy materials, when of lower molecular weight, e.g. 1000 to 10,000, to resinous or elastomeric solids when of higher molecular weight, up to 40,000 and higher. They are very resistant toward thermal degradation, and have useful dielectric properties which are retained at relatively high temperatures. Thus, when of higher molecular weight, they are useful as electrical insulation, in sheet form or as wire insulation, particularly where high temperatures are encountered in use. The lower molecular weight, oily polymers are insulating lubricants as for switch contacts.

The process of the invention comprises the step of pyrolysis of a mercury or silver salt of a dibasic acid, said salt containing in addition to the metal essentially only carbon, fluorine and oxygen, and having at least 6 carbon atoms and containing at least one oxa-atom (i.e., linking oxygen atom) in the carbon chain. The mercury salt is the preferred starting salt, because the mercury eliminated during the pyrolysis is readily distilled from the reaction mixture. The process also comprehends within its scope the pyrolysis of mixtures of salts of such dibasic acids and mercury or silver salts of perfluorodicarboxylic acids and/or monocarboxylic acids, as further described hereinbelow.

Simple dibasic fluorinated acids containing an oxa atom, the metal salts of which can be starting materials for the process, include such compounds as perfluoro(5-oxa-nonanedioic acid) and the like.

Longer chain acids can also be used, including such having a plurality of oxa atoms, and which, in some cases, can be characterized as trimers, tetramers and low polymers of the acid-group terminated type obtainable from polymerization of perfluoroalkylene epoxides. Compounds of this type are disclosed in U.S. Pats. 3,250,806 and 3,250,807. Illustratively, acids of the type

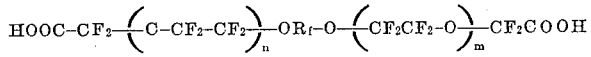

wherein $R_f$ is a perfluoroalkylene radical of 2 to 10 carbon atoms and $n$ and $m$ are integers from zero to 20;

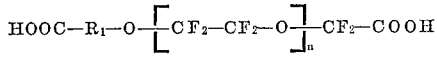

wherein $R_f$ is a perfluoroalkylene radical of 1 to 10 carbon atoms and $n$ is an integer from 1 to 20;

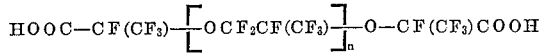

wherein $n$ is an integer from zero to 20; and

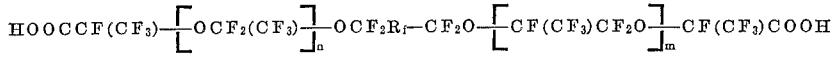

wherein $n$ and $m$ are integers, the sum of which is zero to 35, and $R_f$ is a perfluoroalkylene radical having from zero to 21 carbon atoms, can be used in the process.

Broadly speaking, the process of the invention is carried out by pyrolysis of metal salts of perfluorodicarboxylic acids by heating these salts at a temperature above 200° C., and preferably at a temperature in the range of 300°–400° C., under substantially anhydrous conditions. During pyrolysis, carbon dioxide is eliminated. The metal is eliminated as such. Using mercury perfluoro(4-oxaheptanedioate) as exemplary of the process, the reaction follows the route ($y$ is a whole number):

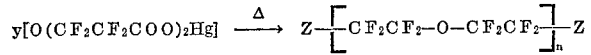

wherein Z is a chain-interrupting mono- or divalent radical of the group: $-CO_2CO-R_f$, $-COF$, $-CO_2HgR_f$, $-HgO_2CR_f$, $-CO_2R_f$, $-O_2CR_f$ and $-HgR_f$, $R_f$ being a lower perfluoroalkyl or perfluoroalkylene radical, and $n$ is a number greater than one. The reaction is not written as stoichiometric, because the products may contain metal or other crosslinking moieties as hereinafter described. Lower perfluoroalkyl radicals have from 1 to 6 carbon atoms.

Mercuric salts of perfluoro diacids having from 4 to about 10 carbon atoms can be used as co-monomers in the pyrolysis to produce polymers with additional numbers of perfluorinated carbon atoms in the backbone. Chain terminators such as mercury salts of perfluoroalkyl monocarboxylic acids, as well as potential crosslinking agents such as mercury salts of perfluoroalkyl and aryl tri and tetracarboxylic acids can also be added to the reaction mixture.

If desired, reduced pressure can be employed although the pyrolysis proceeds equally well under atmospheric pressure.

The metal eliminated from the salt in the reaction is readily removed from the polymer as by washing with a soluble salt-forming mineral acid or by distilling it off in the case of mercury. Unchanged starting materials, if any, are removed by washing with suitable solvents.

In some instances a particular salt may not yield rubbery polymers when these are desired, whether for reasons of purity or some other factor not presently understood. In such cases, the salt is pyrolyzed in admixture with a small amount of a tri- or polyfunctional polyfluorinated carboxylic acid, whereupon the desired rubbery product is obtained.

The higher molecular weight polymers of the invention are insoluble in and not substantially swelled by the ordinary organic solvents, and are soluble in (when of quite low molecular weight) or swelled (when elastomeric) by fluorocarbons such as perfluoropentane, perfluoroheptane, perfluorooctane, by perfluoroethers, perfluorocyclic ethers and perfluoro polyethers, including the lower molecular weight products of this invention, by perfluorotertiary amines and by some halofluorocarbons. When $n$ in the above-described reaction is of the order of 10, oily polymers result; when $n$ is substantially larger, say 100, solids which are resinous or elastomeric are obtained. Preferably, the number of repeating units is from 1000 to 10,000 or more; these are rubbery polymers of especially useful properties. Increasing chain length yields more resilient rubbers having higher tensile strength. Increasing the degree of crosslinking yields harder, less resilient polymers exhibiting reduced swelling in all solvents and which ultimately may approach resins in their properties.

The term "rubber" as used herein conforms to ASTM designation D—1566—62T, in ASTM Standards, part 28, April 1965, page 773.

"Rubber—A material that is capable of recovering from large deformations quickly and forcibly, and can be, or already is, modified to a state in which it is essentially insoluble (but can swell) in boiling solvent, such as benzene, methylethyl ketone and ethanol-toluene azeotrope.

"A rubber in its modified state, free of diluents, retracts within one minute to less than 1.5 times its original length after being stretched at room temperature (20 to 27° C.) to twice its length and held for one minute before release."

The rubbery polymers of this invention appear to conform more closely to the concept of modified rubbers, thus supporting the other evidence of their crosslinked condition. While it is not always possible to say definitely where such crosslinking occurs in these polymers, nevertheless their physical properties and insolubility in solvents, coupled with extensive swelling in certain solvents, demonstrate beyond reasonable doubt that crosslinking exists therein. Without wishing to be bound by the hypothesis, it is considered that crosslinking may occur through retention of chemically bound metal in the polymer, or by rearrangement of oxygen bonds during pyrolysis, causing sufficient crosslinking to produce the rubbery character of these polymers. Alternatively, crosslinking can be produced by copyrolysis with a mercury salt of a tri-, tetra- or poly-carboxylic acid, or by tris salt formation by treating lower molecular weight polymers with e.g. chromium triacetate, etc. Thus the rubbery polymers of the invention can be characterized as modified or crosslinked to an elastomeric condition. Heating to temperatures above 400° C., or milling, may increase the degree of crosslinking.

As is known, modified rubbers from condensation polymers, e.g. polyurethanes and the like, have few if any free chain ends which are available for termination by an interrupting group, or end group. Crosslinking in the present polymers appears to take place at the expense of terminal groups. In the higher molecular weight polymers, end groups are present in progressively smaller numbers, and in extremely high molecular weight polymers and rubbers, end groups may for all practical purposes be entirely absent. In any event, even if present in small amount in such polymers, they play no part in determining the physical properties.

The rubbery polymers of the invention can be extended or filled, as with carbon black, finely divided pigments, fluorocarbon oils, etc. In this way their properties can be modified to improve strength, impart color or provide other desired features.

The pyrolysis of mixtures of salts of perfluoro oxadiacids having different numbers of carbon atoms produces polymers with different perfluoromethylene chains randomly interspersed in the polymer backbone. Similarly, copyrolysis of mixtures of salts of perfluoro oxa-acids, and perfluorodiacids yields polymers with highly random distribution of linking oxygen atoms in the backbones of the polymers.

By adding metallic salts of monobasic perfluoro acids, as for example mercury perfluoropropionate, to the reaction mixture in small amounts, termination by perfluoroalkyl groups can be achieved. Ordinarily, polymers of somewhat lower molecular weight are thus obtained. However, when the higher molecular weight dicarboxylic acids are used, the polymers obtained are nevertheless somewhat rubbery in nature.

Suitable co-monomeric diacids for use in the process are illustrated by perfluoroglutaric acid, perfluoroadipic acid, perfluorosebacic acid and the like. Incorporation of salts of these into the reaction mixture also increases the carbon-oxygen ratio. Mercury of silver salts are of course selected.

Regardless of the salt employed, the polymers of the invention are fluorinated polymers consisting essentially of oxygen, carbon and fluorine, the oxygen atoms thereof joining chains of carbon atoms to form the backbone of the polymer and the carbon:oxygen ratio being at least 2:1, the fluorine atoms being attached to the remaining carbon valences, the linking oxygen atoms of said polymer being joined only to carbon. Where the polymers are, of lower molecular weight, terminal or interrupting groups may be significant. The terminal or interrupting groups, where these are present, can be the metal or metal salts or the like carbonyl-linked functional groups, and include ester, cyano, fluoformyl, carboxy perfluoroalkyl and the like groups. These terminal groups can be used to bring about further crosslinking or chain extensions of the polymers, if desired. Alternatively, the end or terminal groups may be perfluoroalkyl end groups as noted above.

The following examples will more specifically illustrate the process and products of the invention. All parts are by weight and all temperatures in degrees Centigrade unless otherwise specified.

EXAMPLE 1

10.7 g. of the mercuric salt of perfluoro ($\beta,\beta$-oxydipropionic acid) are placed in a 50 ml. of distilling flask which is heated by a fitted heating mantle. A small Bunsen burner is used to assist in the distilling-off of mercury formed in the reaction, and temperatures are measured by an ASTM 400° thermometer, the bulb of which is immersed in the fused salt. The salt melts at 110°–130° and begins to evolve bubbles slowly on further heating, becoming more rapid at 300°. Between 300° and 330° there is copious evolution of metallic mercury. When the measured temperature reaches 360° to 370°, the contents of the flask are boiling vigorously and are colorless or faintly gray. The Bunsen burner is used to drive off mercury and some needle-like crystals in the neck of the flask. As the heating is continued, the boiling decreases, and after an hour or so the contents of the flask are no longer a molten liquid but have solidified to a damp-looking yellowish material, which probably has been heated locally to temperatures somewhat above 370°.

When the apparatus has cooled it is found that the product weights about 2 g., the theoretical yield of

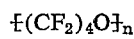

being 4.6 g.; it is found to be a somewhat sticky, rubbery material having a sponge-like texture, tough enough to be wound around a spatula, and cut only with some difficulty. While not dissolved by any solvent tested, it is swelled by perfluoro cyclic ether (available under the trade name FC75) and perfluoro triethylamine, but not by fluorotrichloromethane, carbon tetrachloride or any of a variety of organic liquids including acetone. The polymeric material appears to be a modified rubber, and may be presumed to be crosslinked.

Lower-molecular weight components of the polymer are removed by extraction by $CCl_2F$—$CClF_2$, and the remaining grayish-white rubbery material is no longer tacky. The material shows outstanding chemical and thermal stability, as well as exceptional solvent resistance. Upon thermogravimetric analysis in air it shows little weight loss at 300° C. and about 50 percent loss at 400° C. The material obtained by this procedure was stretched to more than twice its length for one minute, and upon release snapped back to its original dimension with considerable force. Separate particles of the rubber could not be pressed together even upon moderate heating or solvent treatment to give an integral block of rubber.

Desirable low temperature mechanical properties were exhibited by this polymer. A piece of the material was chilled to −80° C. (Dry Ice) and manipulated; while it stiffened quite substantially, it did not become brittle and could be deformed without breakage.

Upon wide-line nuclear magnetic resonance analysis according to C. W. Wilson III, J. Polym. Sci., vol 56, page S16, 1962 only two types of fluorine in equal amounts were seen, corresponding to $CF_2$ groups attached to one O and one C atom; and to $CF_2$ groups attached to two C atoms. These relatively narrow signals characteristic of a substance possessing considerable internal motional freedom were still observed at −65° S.

EXAMPLE 2

Ten grams of mercuric perfluoroxoydipropionate are placed in a 100 cc. flask provided with a solids distillation condenser, connected to a liquid-nitrogen-cooled trap and thence to aspirator. The flask is heated in a Wood's-metal bath, and is maintained between 150° and 200° C. for 45 minutes at 16 mm., then raised to 230° C. during a 10 minute period. The salt starts to melt and bubble. The temperature is then slowly raised to 300° during the next 2 hours, after which $CO_2$ evolution becomes very slow. The pressure is then raised to 150 mm. and the temperature increased to 350° C. during the next 2 hour period. Heating is continued at 345°–365° C. for 2 hours, and the pressure is increased to atmospheric pressure. At this time, gas evolution in the flask has ceased and mercury collects on the wall of the flask. Heating is then stopped. The amount of carbon dioxide collected in the cold trap is ca. 1.3 g. A rubbery polymer remains in the bottom of the flask, with a greasy residue on the walls. The entire contents are removed from the container, washed with nitric acid to remove the mercury, then with water and acetone to remove the acid. The residue is shaken with a perfluorinated cyclic ether (available under the trade name FC75) for 2 days, whereupon the polymer partially dissolves. The solution is filtered and the filtrate evaporated. The insoluble residue is dried under vacuum at 75° C., to produce about 0.5 g. of grayish elastomer. A trace of grease is also recovered. The elastomer gives an infrared spectrum which is consistent with the structure consisting of perfluorobutylene groups connected by oxygen atoms with carbonyl terminal groups. The polymer may be termed polyperfluorotetramethylene oxide.

The elastomer has useful dielectric properties. These are retained even under conditions of heating to 350°–375° C. for 30 minutes. When a piece of the polymer 5 mils thick was heated at 170° C. for 2 hours while subjected to a shearing force of 250 g., it retained its integrity and its dielectric properties.

EXAMPLE 3

A quantity of mercuric perfluorooxydipropionate (11.2 g.) is placed in a reaction tube and heated for 2 hours at 175° C., then for 16 hours at 125° C. under about 16 mm. Hg pressure. After this drying procedure, 11.0 g. of the salt remains. The tube then is placed in a sand bath preheated to 340°. A sublimable material begins depositing on the sides of the tube after a few minutes. After 5 hours, the weight loss is ca. 5 g. and after an additional 3 hours of heating, the total weight loss is ca. 5.4 g.

The product is triturated with water, which becomes strongly acidic. The water layer is decanted, and the gummy gray residue is shaken with 25 cc. of perfluorinated cyclic ether. The perfluoro ether-insoluble portion is dissolved in acetone. Evaporation of the water extract leaves 0.9 g. of a soft sticky gum, consisting of a polymer of very low molecular weight. There is only a trace of material recovered by the evaporation of the perfluoro cyclic ether. Evaporation of the acetone layer yields 2.0 g. of a clear, stiff, somewhat sticky elastomeric gum.

The infrared spectrum of the elastomeric gum is consistent with that of a low polymer of perfluorotetramethylene oxide with carboxyl-containing end groups.

EXAMPLE 4

A mixture of 10.0 g. of mercuric perfluorooxydipropionate and 8.8 g. of mercuric perfluoroglutarate (1:1 mole ratio) is placed in a glass reaction tube and heated for 16 hours at 140° C. under vacuum to dry it (total weight after drying is ca. 18 g.). The tube containing the mixture is then placed in a sand bath at 340°–345° C. and heated for 7 hours. Carbon dioxide is evolved. After heating, the residue, which weighs ca. 9 g., is triturated with 75 ml. of water. The aqueous layer is then decanted and evaporated to yield ca. 2 g. of a fairly clear sticky, gummy material. The water-insoluble residue is washed with 50 ml. of perfluorinated cyclic ether, which dissolves only a trace of the residue. The remainder then is shaken with 50 ml. of acetone which dissolves most of the product. After evaporation of the acetone and drying in vacuo at 50° c., 2.0 g. of a light brown, gummy, slightly elastomeric copolymer remains. If the reaction mixture is instead heated to ca. 380°, the product is largely insoluble in acetone, but is swelled by perfluorinated cyclic ether.

EXAMPLE 5

A useful method for the production of salts of the diacids which are employed in the pyrolysis is illustrated by the following preparation of mercury perfluoroglutarate.

Perfluoroglutaryl chloride (69 g., .25 mole) is stirred in a glass flask at room temperature and hydrolyzed by the slow addition of 15 ml. of water (theoretical amount is 9 ml.). The product is dried under about 16 mm. Hg pressure at about 25°–27° C. for 2 hours and then added slowly to 54 g. of mercuric oxide suspended in 100 ml. of water. The mixture is stirred for 1 hour, filtered and the water removed by heating on a steam bath at aspirator pressure. The salt is dried 2 days at about 0.1 mm. Hg pressure at room temperature. About 119 g. of mercuric perfluoroglutarate (containing some residual strongly held water) are obtained.

EXAMPLE 6

A 5 g. sample of fluorocarbon ether dicarboxylic acid having the composition $C_{24}F_{44}O_{10}H_2$, consisting of a mixture of the three isomeric diacids is converted to the mercuric salt by treatment with a hot aqueous suspension of freshly-precipitated yellow mercuric oxide in the theoretical amount. When little or no yellow solid remains, a 2 percent excess of mercuric oxide is added and the water slowly removed by distillation, first at atmospheric pressure and then at reduced pressure. When thoroughly dry, the material is pyrolyzed according to Example 1 to produce a rubbery yellowish solid containing no free carboxyl or carboxylate salt groups, as judged by the absence of the characteristic absorptions in the infrared spectrum at 5.6 and 5.9 microns, respectively. The product is insoluble in all solvents but is greatly swelled in perfluoroheptane.

EXAMPLE 7

A 10 g. sample of mixed isomers of the fluorocarbon ether dicarboxylic acid $C_{58}F_{112}O_{20}H_2$, similar in structure to that described in Example 6, is converted to the diethyl ester by prolonged reflux with anhydrous ethanol, a small amount of toluene having been added to facilitate azeotropic removal of water formed in the reaction. After removal of all volatile materials in vacuo, and treatment of the residue with excess anhydrous ammonia to convert all ester groups to carboxylic amide groups, the product, mixed with 1 g. of phosphorus pentoxide, is heated for 10 hours at 150° to form a dinitrile. The desired dinitrile, separated from the polyphosphoric acid by means of its solubility in perfluoroheptane, is dried in vacuo at 100° to remove solvent. Its infrared spectrum exhibits the characteristic, though very weak, $C \equiv N$ stretching vibration at 4.4 microns, and lacks those absorptions due to carbonyl stretching in the 5 to 6 micron region. If the latter are present, the material should be reprocessed to achieve more complete conversion to nitrile.

Analysis of the product for nitrogen gives 0.8 to 0.9 percent N, the latter value corresponding exactly to the empirical formula $C_{58}F_{112}O_{16}N_2$. A 1 g. sample of this product, irradiated for 24 hours with unfiltered ultraviolet radiation from a mercury arc lamp, is converted to a stiff rubbery solid showing infrared absorption at 5.7 to 5.8 microns, characteristic of the $-C=N-$ polyazine structure, but lacking that at 6.3 microns characteristic of the triazine structure. It is swelled somewhat by perfluoroheptane, but does not dissolve therein.

EXAMPLE 8

A 1 g. portion of the dinitrile product from Example 7, corresponding to the formula $C_{58}F_{112}O_{16}N_2$, is placed in a heavy-walled glass ampoule under an atmosphere of anhydrous hydrogen chloride, and the end is sealed. The tube is heated to 200°–250° for 8 hours and opened, then heated in vacuo for 2 hours to remove dissolved HCl. The recovered product is a moderately soft rubbery solid which shows infrared absorption bands at 6.3 microns due to the triazine structure, but lacks the absorptions around 5.8 microns characteristic of the polyazine structure. It is not soluble in perfluoroheptane but is extensively swelled thereby.

EXAMPLE 9

Preparation of the mercury salt of triazine tricarboxylic acid $(C_{15}F_{18}N_3O_6)_2Hg_3$ from $N \equiv C-(CF_2)_3COCl$ is carried out by catalytic trimerization of the nitrile-acyl chloride in an autoclave at 150° to 200° in the presence of 10 mole percent of anhydrous hydrogen chloride. The product, after warming in vacuo to remove dissolved hydrogen chloride and unreacted starting material, is a viscous sirup showing strong infrared absorption at 6.39 microns due to $$HO_2C-\underset{\underset{CF_3}{|}}{C}F-O-CF_2-\underset{\underset{CF_3}{|}}{C}F-O-CF_2-\underset{\underset{CF_3}{|}}{C}F-O-(CF_2)_6-O-\underset{\underset{CF_3}{|}}{C}F-CF_2-O-\underset{\underset{CF_3}{|}}{C}F-CF_2-O-\underset{\underset{CF_2}{|}}{C}F-CO_2H$$

$$HO_2C-\underset{\underset{CF_3}{|}}{C}F-O-CF_2-\underset{\underset{CF_3}{|}}{C}F-O-(CF_2)_6-O-\underset{\underset{CF_3}{|}}{C}F-CF_2-O-\underset{\underset{CF_3}{|}}{C}F-CF_2-O-\underset{\underset{CF_3}{|}}{C}F-CF_2-O-\underset{\underset{CF_3}{|}}{C}F-CO_2H$$

$$HO_2C-\underset{\underset{CF_3}{|}}{C}F-O-(CF_2)_6-O-\underset{\underset{CF_3}{|}}{C}F-CF_2-O-\underset{\underset{CF_3}{|}}{C}F-CF_2-O-\underset{\underset{CF_3}{|}}{C}F-CF_2-O-\underset{\underset{CF_3}{|}}{C}F-CF_2-O-\underset{\underset{CF_3}{|}}{C}F-CO_2H$$

the triazine structure, in addition to that characteristic of the acyl chloride. It may be distilled at 150° at ca. 25 mm. Hg and has 14.8 percent Cl (hydrolyzable). Conversion to the mercuric salt is then carried out according to the procedure in Example 5.

EXAMPLE 10

The procedure of Example 1 is repeated, except that to the salt is added 0.3 g. of the mercuric salt of Example 9. After pyrolysis, the recovered solid is a dark-colored, very stiff rubber, which swells only slightly in boiling perfluoroheptane.

EXAMPLE 11

A sample of 5 g. of the mercuric salt of the perfluoroether dicarboxylic acid $$HO_2C—(CF_2)_5—O—(CF_2CF_2O)_4CF_2CO_2H$$

is pyrolyzed according to the procedure of Example 1 to yield a soft rubber, partially soluble in boiling perfluoroheptane. The insoluble portion is greatly swelled thereby.

EXAMPLE 12

A sample of 5 g. of the mercuric salt of the perfluoroether dicarboxylic acid $$HO_2C—(CF_2)_5O—(CF_2CF_2O)_4CF_2CO_2H$$

is mixed with 0.20 g. of the mercuric salt of Example 9 and pyrolyzed according to Example 1 to yield a moderately stiff rubber, insoluble but somewhat swelled by boiling perfluoroheptane.

EXAMPLE 13

To a sample of 10 g. of the mercuric salt of perfluoro 4-oxaheptanoic acid is added 0.1 g. of the mercuric salt of perfluorobutyric acid. The mixture is melted and caused to mix homogeneously, and then is pyrolyzed according to Example 1. The product is not a crosslinked modified rubber but is instead soluble in perfluoroheptane. By vapor-pressure osmometry in which perfluorinated cyclic ether "FC75" is used as the solvent, the molecular weight of the polymer is found to be of the order of 10,000 to 20,000. The polymer is a viscous, chemically highly inert, greasy substance, not elastomeric in character but instead useful for lubrication of, for example, sliding electrical contacts.

EXAMPLE 14

In the procedure of Example 13 the amount of mercuric perfluorobutyrate is increased to 2.5 g., and the recovered oil shows a molecular weight around 1500. The NMR spectrum of a 20 percent solution of it in CCl₃F shows the characteristic twin peaks for the $$—O—(CF_2)_4—O—$$

repeating unit at 83 $\phi$* and 126 $\phi$* for the CF₂ groups connected to oxygen and for the central CF₂ groups respectively. In this case, the molecular weight is low enough so that signals from the end groups also can be seen in the spectrum. Particularly characteristic for the terminal fluoroalkyl group are the peaks at 80 $\phi$* and 122 $\phi$*. Similar spectra are shown by analogous polymers of higher molecular weight, except that the signals characteristic of the end groups decrease toward zero intensity as the molecular weight increases.

What is claimed is:

1. A rubbery polymer containing essentially only carbon, oxygen and fluorine, in which the ratio of fluorine to carbon is 2:1 and which contains oxygen as a linking group, the ratio of carbon to oxygen being at least 2:1 and not more than 8:1, having from 100 to 10,000 structural units forming the backbone thereof, the said structural units having the formulae

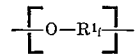

and

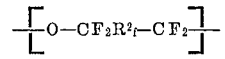

wherein $R^1_f$ is a straight or branched chain perfluoroalkylene group having 2 to 8 carbon atoms, and $R^2_f$ is a perfluoroalkylene group having zero to 21 carbon atoms; the said polymer being characterized by insolubility in all solvents and by swelling in fluorocarbon solvents.

2. A polymer according to claim 1, in which $R^1_f$ contains 3 carbon atoms.

3. A polymer consisting essentially of repeating units of the formula

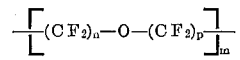

wherein $n$ and $p$ each are a number from 2 to 10 and $m$ is a number of at least 20 and up to 10,000.

4. A polymer according to claim 3, said polymer being terminated by end groups of the formulae $R_f$, —CN, —COF, —CO₂HgR_f or —HgO₂C—R_f, wherein $R_f$ is a lower perfluorinated alkyl radical.

5. A polymer according to claim 3, in which $n$ is 4.

6. A polymer according to claim 3, in which the end groups are perfluoroalkyl radicals.

7. A process for preparing polymers containing essentially only carbon, fluorine and oxygen, which comprises pyrolyzing a mercury or silver salt of a dibasic acid containing only carbon, fluorine and oxygen, the said acid having at least 6 carbon atoms and containing one to 41 linking oxygen atoms in the carbon chain thereof, under substantially anhydrous conditions and at a temperature at which carbon dioxide is eliminated.

8. The process according to claim 7, which comprises pyrolyzing a salt of a dibasic acid of the formula $$HOOC(CF_2)_p—O—(CF_2)_pCOOH$$

wherein $p$ is an integer from 2 to 4, for a period of time sufficient to form a rubbery, elastomeric solid.

9. The process according to claim 8, in which the pyrolysis is carried out in the presence of mercury or silver salts of perfluorocarbon dibasic acids having 4 to 12 carbon atoms.

10. The process according to claim 8, in which the pyrolysis is carried out in the presence of the mercury salt of a polycarboxylic polyfluorinated acid.

References Cited

UNITED STATES PATENTS

| | | | |
|---|---|---|---|
| 3,125,599 | 3/1964 | Warnell | 260—535 |
| 3,242,218 | 3/1966 | Miller | 260—615 |
| 3,250,806 | 5/1966 | Warnell | 260—535 |
| 3,250,808 | 5/1966 | Moore et al. | 260—535 |
| 3,274,239 | 9/1966 | Selman | 260—514 |

JOSEPH L. SCHOFER, Primary Examiner

C. A. HENDERSON, JR., Assistant Examiner

U.S. Cl. X.R.

252—65; 260—37, 430, 431, 438.5, 484, 535, 544, 615